(12) United States Patent
Amin et al.

(10) Patent No.: US 7,418,488 B1
(45) Date of Patent: Aug. 26, 2008

(54) NETWORK ADDRESS ASSIGNMENT SERVER WITH CONFIGURATION UPDATING CAPABILITY

(75) Inventors: Muhammad Amin, Fremont, CA (US); Osman Ismael, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 735 days.

(21) Appl. No.: 10/969,304

(22) Filed: Oct. 19, 2004

(51) Int. Cl.
*G06F 15/177* (2006.01)

(52) U.S. Cl. .................................. 709/220; 709/221

(58) Field of Classification Search ................ 709/220, 709/221
See application file for complete search history.

(56) References Cited

U.S. PATENT DOCUMENTS 7,007,080 B2 * 2/2006 Wilson ....................... 709/221

2003/0101245 A1 * 5/2003 Srinivasan et al. .......... 709/221

* cited by examiner

*Primary Examiner*—Ario Etienne
*Assistant Examiner*—Michael C Lai
(74) *Attorney, Agent, or Firm*—Bobby K. Truong; Hickman Palermo Truong & Becker LLP

(57) ABSTRACT

A network address assignment server is disclosed, which is capable of dynamically updating its own configuration information during runtime. The configuration information (which may include, for example, one or more network addresses that can be assigned by the server, an association between a device identifier and a specific network address, etc.) may be updated and then used by the server without restarting the server. As a result, the server can update its configuration information without incurring any server downtime.

36 Claims, 6 Drawing Sheets

NETWORK ADDRESS ASSIGNMENT SERVER WITH CONFIGURATION UPDATING CAPABILITY

BACKGROUND

A network device needs a network address, such as an IP (Internet Protocol) address, in order to effect communication on a network. The network address allows the device to uniquely identify itself on the network, and enables other devices on the network to direct messages to that network address, and hence, that device.

In many networks, the number of devices or nodes is greater than the number of network addresses available to the network. Because there are more nodes than network addresses, it is not possible to permanently assign a unique network address to each and every node. In such networks, network communication is enabled by having the various devices share the available network addresses. Sharing is made possible by the fact that many network devices do not need to be connected to the network all of the time. For example, a company may have many portable computers that are connected to the network only during certain times, and at all other times are completely disconnected from the network. Because many network devices need to connect to the network only some of the time, it is possible for those devices to share network addresses.

To enable the sharing of network addresses, a network address assignment server is usually implemented. This server, often referred to as a DHCP (dynamic host configuration protocol) server, is responsible for the assignment and reclamation of network addresses. More specifically, when a network device (e.g. a portable computer) needs to communicate on the network, the device submits an address request to the DHCP server. The DHCP server responds to this request by dynamically assigning a network address to the device. The device thereafter uses the network address to effect communication on the network, and as long as the device is connected to the network, that network address belongs to that device. At some point, the device logs off from the network. When that happens, the DHCP server reclaims the network address, and is thereafter free to assign the network address to some other network device. The network address is thus shared among multiple devices.

Typically, the operation of the DHCP server is dictated by a set of configuration information. The configuration information may specify, for example, which network addresses can be assigned by the DHCP server. The DCHP server uses the configuration information to determine its behavior during runtime. Typically, the configuration information takes the form of a text file that is read by the DHCP server when the server starts up.

At certain times during the operation of the DHCP server, it may be necessary to update the configuration information. Currently, to update the configuration information, some mechanism other than the DHCP server is used. For example, an administrator may use a text editor to edit the text file in which the configuration information is stored. Once the text file is updated, the DHCP server is restarted to cause the DHCP server to read the updated text file and to implement the updated configuration information contained therein. Thus, in the current implementation, updating the configuration information and having the DHCP server implement the update requires the server to be shut down and restarted, which in turn requires server downtime.

SUMMARY

In accordance with one embodiment of the present invention, there is provided an improved network address assignment (NAA) server, which is capable of updating and implementing updated configuration information without incurring any server downtime. In one embodiment, the NAA server maintains its own configuration information, and provides an update functionality that can be invoked by other entities to cause the NAA server to update its own configuration information. Once updated, the configuration information is implemented by the NAA server without restarting the NAA server.

In one embodiment, the NAA server operates as follows. The NAA server receives an instruction from an entity to update the NAA server's configuration information. Along with this instruction, or as part of a separate message, the NAA server receives some update information indicating one or more changes to be made to the configuration information. In response, the NAA server updates its configuration information in accordance with the update information to derive a set of updated configuration information. The NAA server thereafter uses the updated configuration information to determine its behavior at runtime. The NAA server does not need to be restarted in order to use the updated configuration information.

After updating the configuration information, the NAA server receives, from a network device, a request for a network address. In response to the request, the NAA server determines, based at least partially upon the updated configuration information, a particular network address to assign to the network device. The NAA server then assigns the particular network address to the network device. As noted above, between updating the configuration information and using the updated configuration information to determine the particular network address to assign to the network device, the NAA server does not need to be restarted. Thus, the NAA server is able to update and implement updated configuration information without incurring any server downtime.

DETAILED DESCRIPTION OF EMBODIMENT(S)

NAA Server Overview

Figure 1:
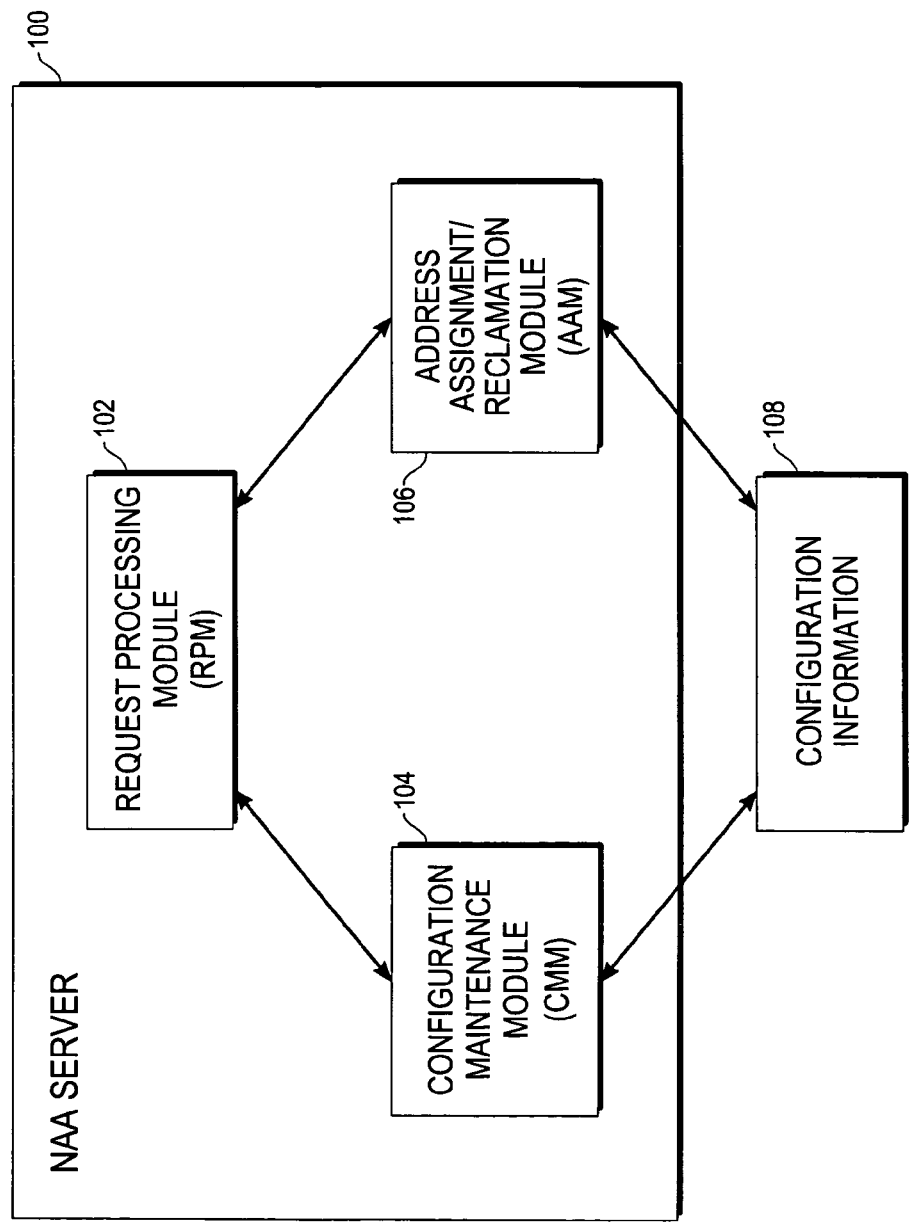
FIG. 1 is a functional block diagram of a network address assignment server, in accordance with one embodiment of the present invention.

With reference to FIG. 1, there is shown a functional block diagram of a network address assignment (NAA) server 100 in accordance with one embodiment of the present invention. As shown, the NAA server 100 comprises a request processing module (RPM) 102, a configuration maintenance module (CMM) 104, and an address assignment/reclamation module (AAM) 106. The NAA server 100 may be used to dynamically assign network addresses to network devices. As used herein, the term network address refers broadly to any address that can be used by a network device to receive directed communications on a network. A network address may be an IP address (which is a routable address that can be processed by one or more routers) or it may be another type of address. All types of network addresses are within the scope of the present invention.

Figure 6:
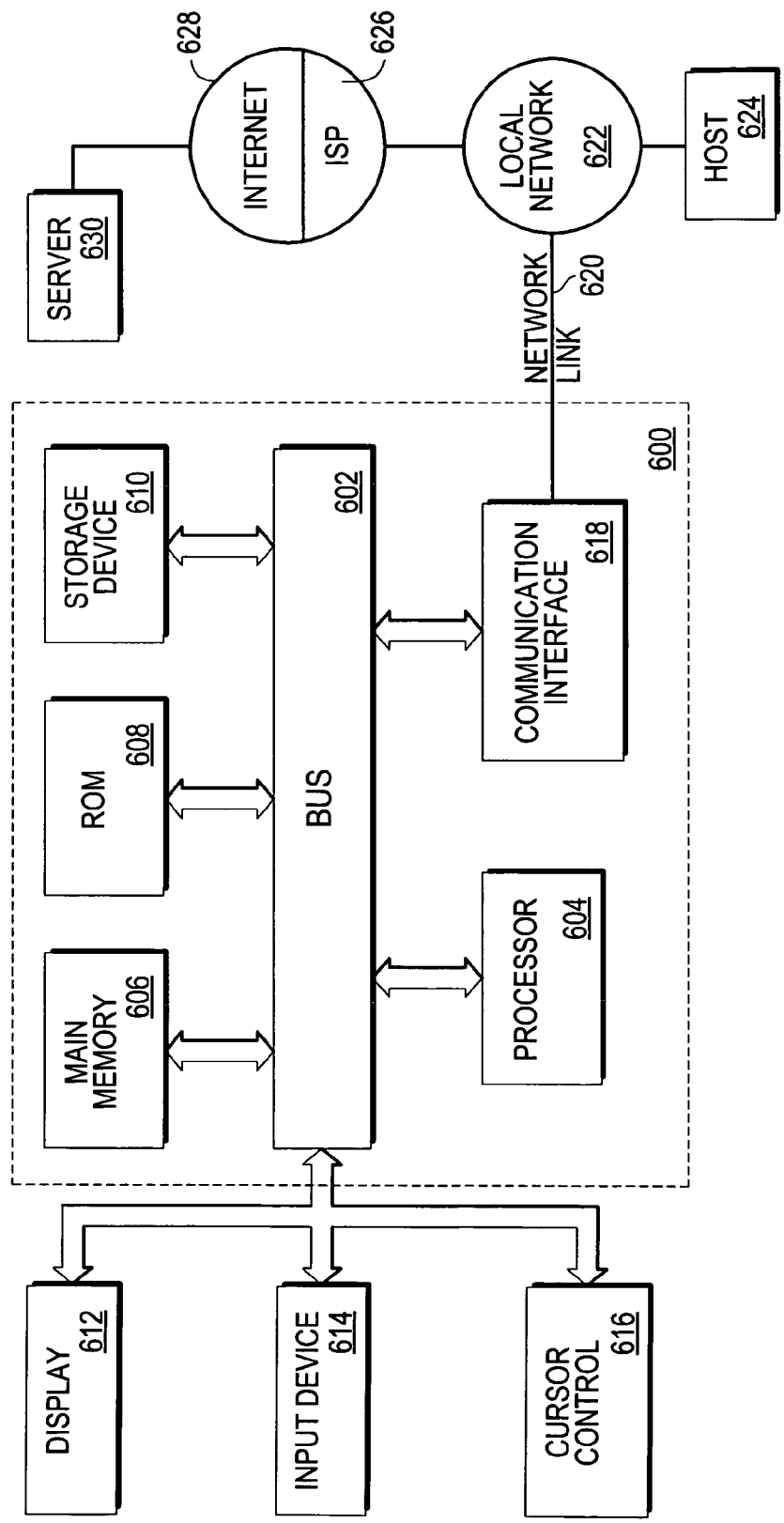
FIG. 6 is a block diagram of a general purpose computer system in which one embodiment of the present invention may be implemented.

In one embodiment, the NAA server 100 is implemented in software (that is, the functionality of the NAA server 100 is derived by executing one or more sets of instructions on a computer system, such as the sample system shown in FIG. 6). Alternatively, the functionality of the NAA server 100 may be derived using hardwired logic (e.g. an ASIC) and programmable firmware. These and other implementations are within the scope of the present invention.

FIG. 1 shows a set of configuration information 108. As will be discussed further in a later section, this set of configuration information 108 is updated and maintained by the CMM 104, and is used by the AAM 106 during regular operation. In one embodiment, the configuration information 108 takes the form of one or more data structures, and contains information that is used by the NAA server 100 to determine the server's behavior at runtime. For purposes of the present invention, the configuration information 108 may contain any type of information. For example, it may contain one or more sets of network addresses that the NAA server 100 can assign to network devices. It may also contain information specifying an association between a specific network address and a device identifier (e.g. a media access control (MAC) address) to indicate that the specific network address is to be assigned only to a network device having that device identifier. This and other information may be included in the configuration information 108. Basically, any information that can be used by the NAA server 100 to determine the server's behavior at runtime can be included in the configuration information 108.

Request Processing Module

In one embodiment, the RPM 102 is the component that acts as the server's interface to all external components. In this capacity, the RPM 102 performs a number of functions, which may include but are not limited to: (a) receiving update instructions from external entities to update the server's configuration information 108; (b) receiving update information from those entities indicating what changes are to be made to the configuration information 108; (c) determining whether those entities are authorized to update the configuration information 108; (d) receiving network address requests from network devices; (e) receiving notification that a network device will no longer be using a previously assigned network address; (f) determining, based upon the nature of a request or instruction, whether to forward the request or instruction to the CMM 104 or AAM 106; and (g) providing appropriate responses to the external components. The RPM 102 may also perform other functions as well. The operation of the RPM 102 will be discussed further in a later section.

Configuration Maintenance Module

If an instruction to update the configuration information 108 is received from an authorized entity, then that instruction is forwarded by the RPM 102 to the CMM 104. Also forwarded is a set of update information that specifies what change(s) are to be made to the configuration information 108. In response to this instruction, the CMM 104 updates the configuration information 108 in accordance with the update information. This may involve, for example, adding or removing one or more network addresses from one or more sets of network addresses that the NAA server 100 can assign. This update process may also involve adding or removing one or more network address/device identifier associations. These and other update operations may be performed by the CMM 104.

Address Assignment/Reclamation Module

If a request for a network address is received from a network device, that request is forwarded by the RPM 102 to the AAM 106. Similarly, if a notification is received that a network device is no longer using a previously assigned network address, that notification is also forwarded by the RPM 102 to the AAM 106.

In response to a network address request (which, in one embodiment, includes a device identifier for the network device making the request), the AAM 106 consults the configuration information 108. Based upon the contents of the configuration information 108, the AAM 106 determines a particular network address to assign to the network device. This determination may involve, for example, determining whether there is an association between the network device's device identifier and a specific network address. If so, the AAM 106 assigns the specific network address to the network device. If not, then the AAM 106 selects a network address from a pool of available addresses and assigns that address to the network device.

In response to a notification that a network device will no longer be using a previously assigned network address, the AAM 106, in one embodiment, determines which network address was previously assigned to the network device. The AAM 106 then reclaims the network address and puts it back into a pool of available addresses that can be reassigned in the future.

A point to note is that the AAM 106 uses the configuration information 108 to determine its behavior at runtime. This is the same set of configuration information 108 that is updated and maintained by the CMM 104. Thus, as soon as the configuration information 108 is updated by the CMM 104, the updated configuration information 108 can be used by the AAM 106. The NAA server 100 does not need to be restarted in order for the updated configuration information to take effect. As a result, the NAA server 100 can update its own configuration information and implement the updated configuration information without incurring any server downtime.

Sample System

Figure 2:
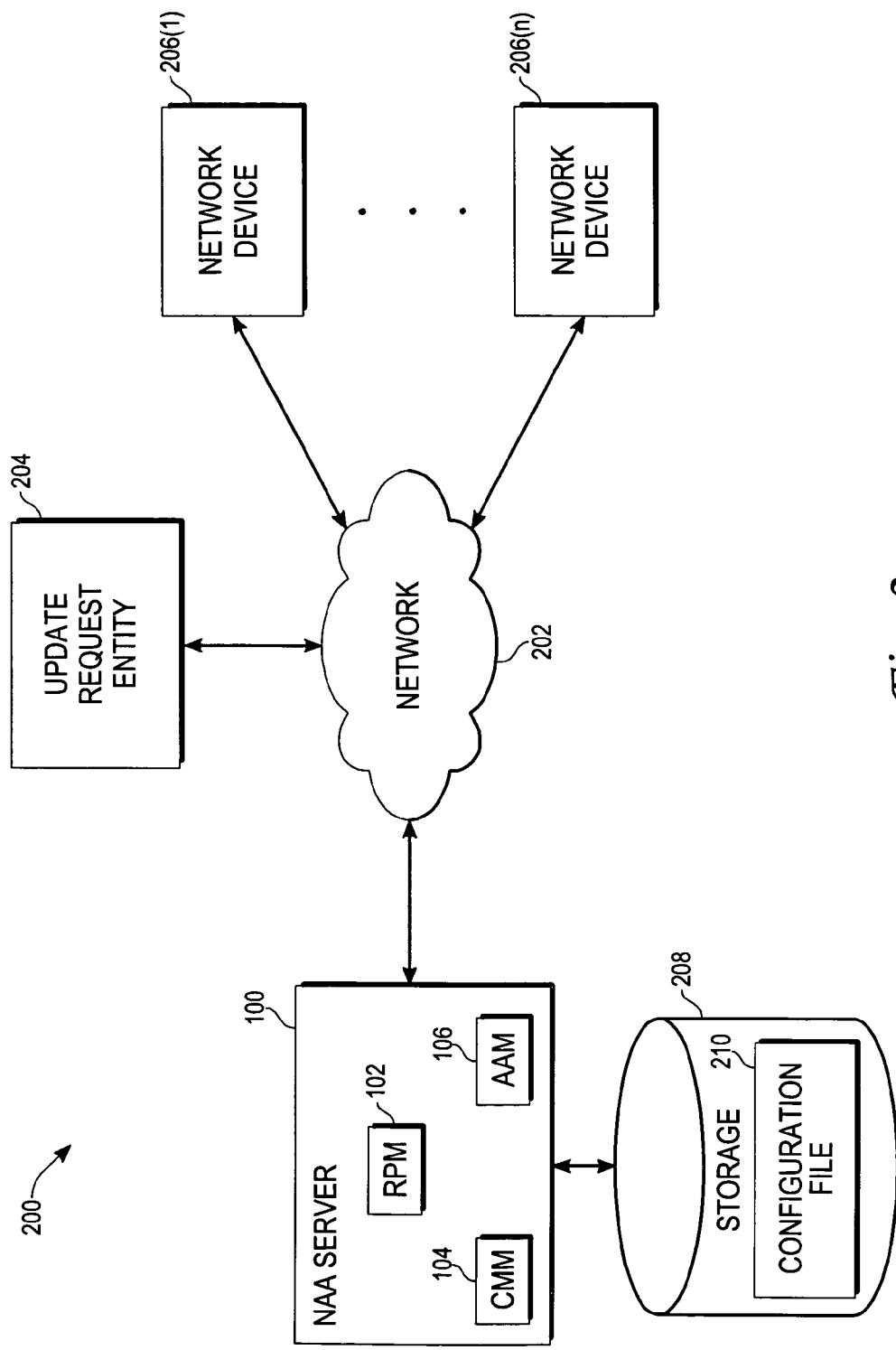
FIG. 2 is a diagram of a networked system in which one embodiment of the present invention may be implemented.

With reference to FIG. 2, there is shown a sample networked system 200 in which one embodiment of the NAA server 100 may be implemented. In system 200, the NAA server 100 is coupled to a network 202, which in turn is coupled to an update request entity 204 and a plurality of network devices 206. For purposes of the present invention, the network 202 may be any type of network, including but not limited to a local area network and a wide area network, such as the Internet. Anything that can communicatively couple the various components of the system 200 to each other may be used as network 202.

The network devices 206 may be any type of device. For example, a network device 206 may be a portable computer, a desktop computer, a mainframe, a printer, a router, etc.

Anything that can couple to and communicate on the network 202 may be used as a network device 206.

The update request entity 204 represents any entity that can send an update instruction to the NAA server 100 to cause the server to update its configuration information 108. For example, the update request entity 204 may be a console from which an administrator issues an update command, or it may be a management server responsible for managing the networked system 200, or it may be some other type of entity. Anything capable of sending an update instruction to the NAA server 100 may be implemented as the update request entity 204.

In addition to being coupled to the network 202, the NAA server 100 may also be coupled to a persistent storage 208 that stores a configuration file 210. In one embodiment, the configuration file 210 is distinct from the configuration information 108 of FIG. 1. More specifically, the configuration file 210 is the file that is read by the NAA server 100 at startup time, while the configuration information 108 is the set of data structures that is generated by the NAA server 100 based upon the information contained in the configuration file 210. In a sense, the configuration information 108 represents a runtime version of the information in the configuration file 210. In one embodiment, the configuration information 108 is stored in memory to facilitate its use during runtime. At startup, the information in the configuration file 210 and the information in the configuration information 108 are consistent. However, as the configuration information 108 is updated by the CMM 104, the two sets of information may diverge. Put another way, updating the configuration information 108 does not require that the configuration file 210 also be updated. The two sets of information do not need to be kept consistent. Of course, if so desired, the NAA server 100 may keep the two sets of information consistent by updating the configuration file 210 whenever the configuration information 108 is updated.

Sample Operation

Figure 3:
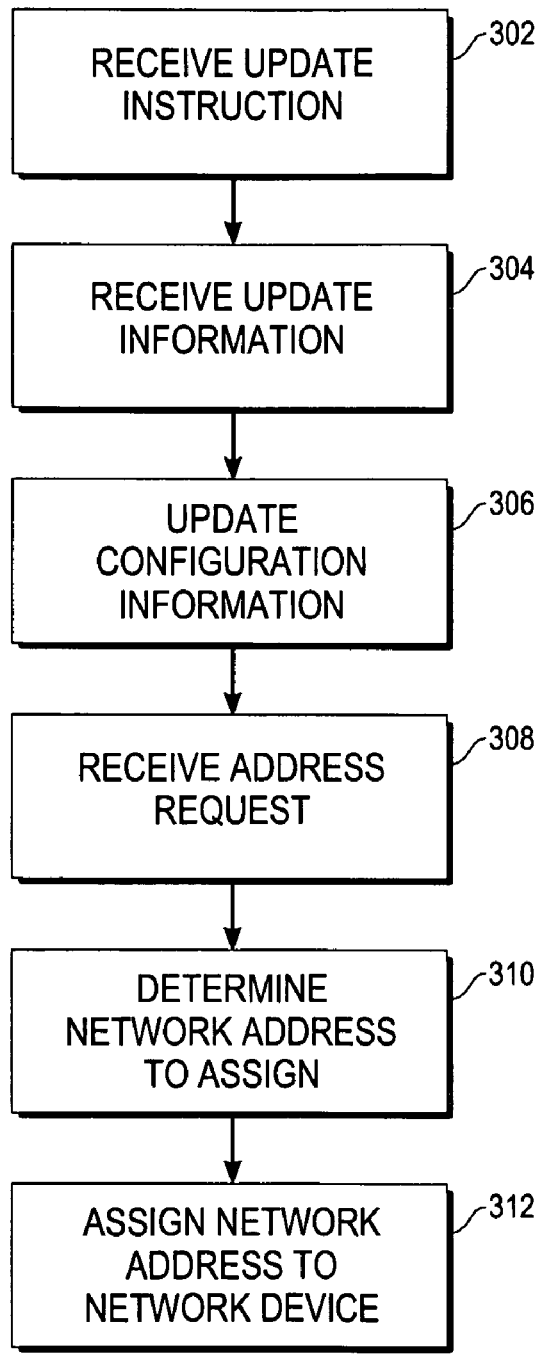
FIG. 3 is a flow diagram illustrating the operation of a network address assignment server, in accordance with one embodiment of the present invention.

With reference to FIGS. 1 and 2 and the flow diagram of FIG. 3, a sample operation of the NAA server 100 within system 200 will now be described. Initially, the NAA server 100 is started. When that happens, the CMM 104 reads the configuration file 210 on storage 208 and generates a set of data structures that makes up the configuration information 108. The CMM 104 then stores the configuration information 108 in memory for use during runtime. With that being done, the NAA server 100 is ready for regular operation.

At some point during regular operation, the RPM 102 receives (block 302) (i.e. RPM 102 is a means for receiving) an update instruction from the update request entity 204 to update the configuration information 108. In one embodiment, in response to this instruction, the RPM 102 determines whether the update request entity 204 is authorized to send this instruction. The RPM 102 may make this authorization determination using any known verification technique (e.g. digital signatures, handshaking protocol, encryption/decryption, etc.). If the RPM 102 determines that the update request entity 204 is not authorized to send the update instruction, then the update instruction is ignored. However, if the update request entity 204 is authorized to send the update instruction, then the RPM 102 receives (block 304) (i.e. RPM 102 is a means for receiving) update information from the update request entity 204 indicating what change(s) are to be made to the configuration information 108. This update information may be received as part of the update instruction, or it may be received in a separate message. Thereafter, the RPM 102 forwards the update instruction and the update information to the CMM 104 for processing.

In response to the update instruction, the CMM 104 updates (block 306) (i.e. CMM 104 is a means for updating) the configuration information 108 in accordance with the update information to derive a set of updated configuration information 108. In one embodiment, to do so, the CMM 104 obtains a lock on the configuration information 108, updates the configuration information 108, and then releases the lock. Once the lock is released, the AAM 106 can see the updated configuration information 108 immediately and can start using it. Thus, the update is implemented without having to restart the NAA server 100.

In one embodiment, updating the configuration information 108 may entail adding or removing one or more network addresses from one or more sets of network addresses that can be assigned by the NAA server 100. It may also entail adding or removing one or more network address/device identifier associations. For example, the update information may indicate that the association Network address X:Device Identifier Y should be added. This association tells the AAM 106 that network address X should be assigned to only the network device having the device identifier Y. This and other updates may be made to the configuration information 108.

After the configuration information 108 is updated, it is used by the AAM 106 to process address requests. More specifically, at some point during regular operation, the RPM 102 receives a broadcast message from a network device 206 asking for the network address of the NAA server 100. The RPM 102 responds to this by sending a broadcast message containing the network address of the NAA server 100. Upon receiving this broadcast message, the network device 206 uses the NAA server's network address to send a network address request to the RPM 102. In one embodiment, included with this network address request is a device identifier (e.g. a MAC address) associated with the network device 206. The RPM 102 receives (block 308) (i.e. RPM 102 is a means for receiving) this network address request, and forwards it to the AAM 106 for processing.

In response, the AAM 106 determines (block 310) (i.e. AAM 106 is a means for determining) a particular network address to assign to the network device 206. In one embodiment, the AAM 106 makes this determination by accessing the updated configuration information 108, and determining whether there is an association specified therein that associates the network devices' device identifier with a specific network address. If so, then that specific network address will be the one assigned to the network device 206. If not, then the AAM 106 selects a network address from a pool of available network addresses. Once the AAM 106 has determined which network address to assign to the network device 206, it assigns (block 312) (i.e. AAM 106 is a means for assigning) that address to the network device 206, and this address assignment is communicated (via a broadcast message) to the network device 206 by the RPM 102. The network device 206 can thereafter use that network address to identify itself and to receive non-broadcast, directed communications on the network. In this manner, the AAM 106 uses the updated configuration information 108 to assign a network address without having to restart the NAA server 100.

Sample Resource Grid System

The NAA server 100 may be implemented advantageously in any networked system in which network addresses need to be dynamically assigned. A networked system in which the NAA server 100 is especially useful is that shown in FIG. 4, wherein the system 400 comprises a resource grid 404 made up of a plurality of network devices 406, a grid manager 408, a provisioning server 410, an NAA server 100, and a network 402 for communicatively coupling the various components to each other. As will be discussed further in a later section, in this system, the configuration information of the NAA server 100 is updated on a relatively frequent basis. Thus, the fact that the NAA server 100 can implement updated configuration information without incurring any server downtime greatly enhances the performance of the system 400.

In system 400, the resource grid 404 acts as a ubiquitous set of resources that can be used for any purpose. For example, at one time, network device 406(1) may be used to run a web server for customer 1 and network device 406(n) may be used to run a database for customer 2, while at another time network device 406(1) may be used to run a storefront for customer 3 and network device 406(n) may be used to run a financial application for customer 4. The decision on how the network devices 406 in the resource grid 404 are used is made by the grid manager 408.

To implement its decisions, the grid manager 408 uses the provisioning server 410. More specifically, it is the provisioning server 410 that provisions and deploys the proper software onto the proper network device 406 to implement the grid manager's managerial decisions. For example, if the grid manager 408 decides that network device 406(1) is to run a web server on a UNIX platform, then it is up to the provisioning server 410 to deploy a UNIX operating system onto network device 406(1) and to deploy a web server to run on the UNIX operating system on network device 406(1).

In carrying out its provisioning duties, the provisioning server 410 needs to communicate with the network devices 406. To do so, the provisioning server 410 needs to have definite network addresses for the network devices 406. Since it is the NAA server 100 that assigns the network addresses, the provisioning server 410 interacts with the NAA server 100 to coordinate the assignment of these network addresses.

For purposes of the present invention, the grid manager 408 and the provisioning server 410 may be implemented using any known technology. For example, the functionality of these components may be derived by executing one or more sets of instructions on one or more computer systems, such as the sample system shown in FIG. 6. Alternatively, these components may be implemented using hardwired logic (e.g. an ASIC). These and other implementations are within the scope of the present invention.

Sample Operation within Sample Grid System

Figure 4:
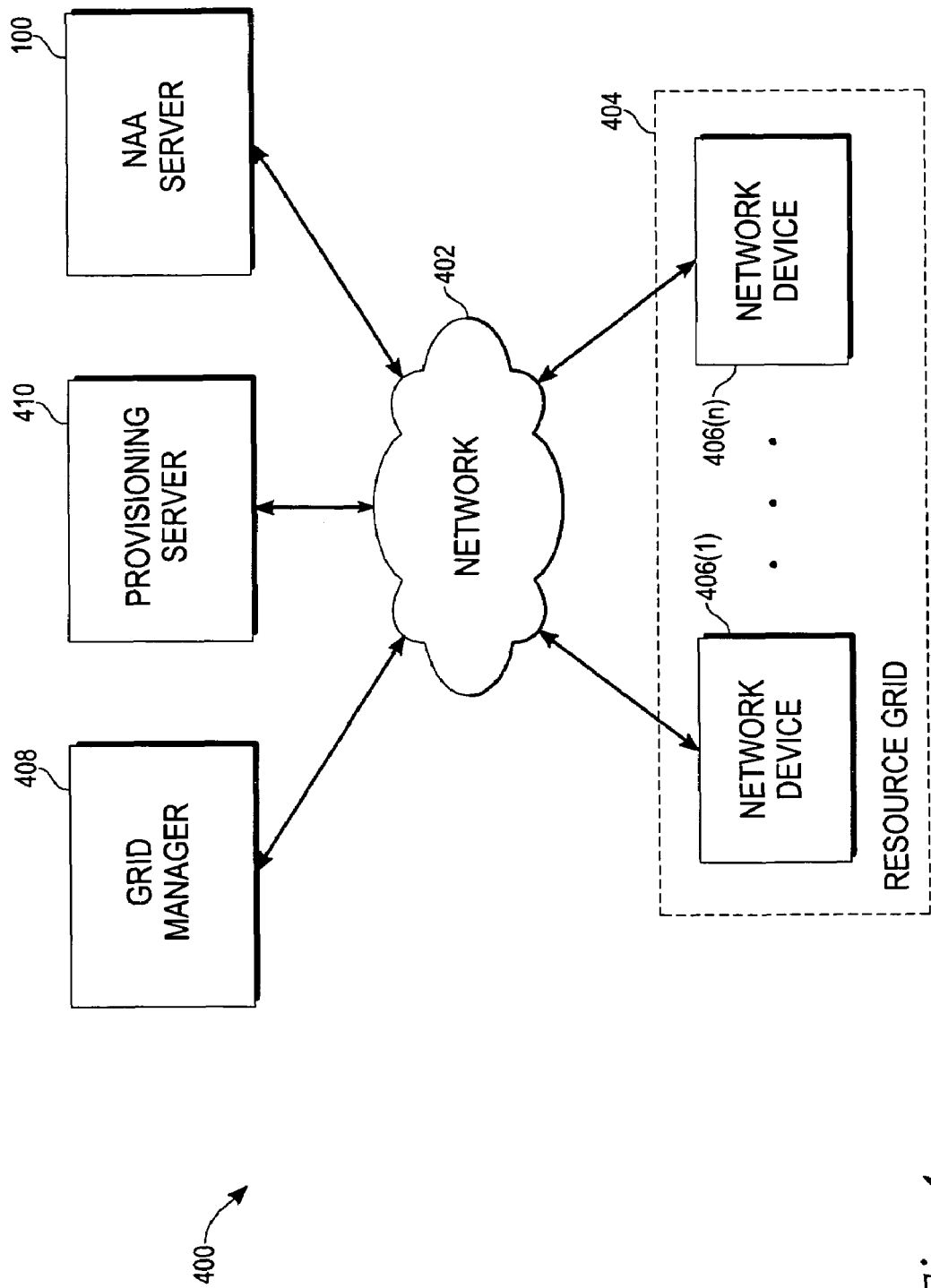
FIG. 4 is a diagram of a networked resource grid system with a provisioning server in which one embodiment of the present invention may be implemented.
Figure 5:
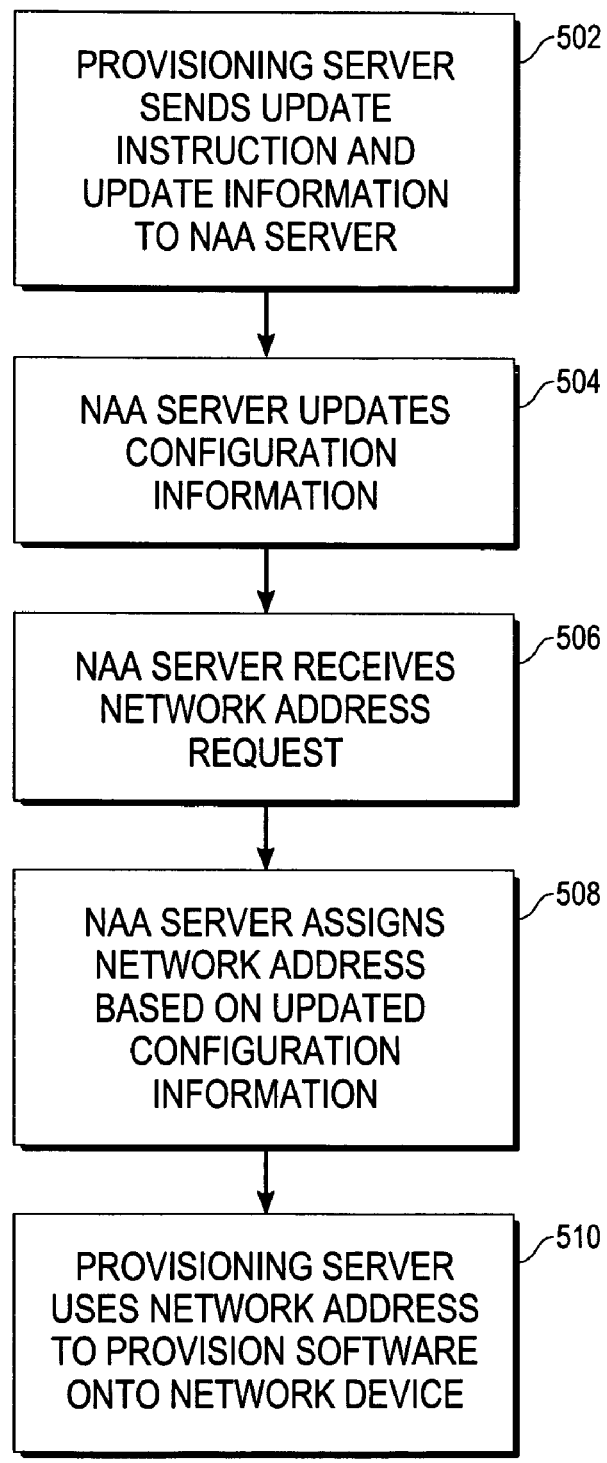
FIG. 5 is a flow diagram illustrating the operation of the system of FIG. 4 in accordance with one embodiment of the present invention.

To illustrate a sample operation of the grid system 400 of FIG. 4, reference will now be made to FIGS. 1 and 4, and the flow diagram of FIG. 5. In the following discussion, it will be assumed that the grid manager 408 and the provisioning server 410 are already up and running. It will also be assumed that the NAA server 100 has already generated the configuration information data structures 108 and thus is ready for regular operation.

Suppose that the grid manager 408 decides that network device 406(1) should be used to run a web server on a UNIX operating system. Suppose further that the network device 406(1) is to have a specific network address X. The grid manager 408 communicates these requirements to the provisioning server 410, and instructs the provisioning server 410 to implement the requirements.

In response to the grid manager's instruction, the provisioning server 410 determines the device identifier for the network device 406(1). In one embodiment, the provisioning server 410 has access to a list of all of the network devices 406 in the system 400; thus, the provisioning server 410 can determine the device identifier of the network device 406(1). This device identifier may be, for example, the MAC address of the network card within the network device 406(1). For the sake of example, it will be assumed that the device identifier is Y. Once the device identifier is determined, the provisioning server 410 associates the device identifier with the network address to derive a set of update information. In this example, the network address is X and the device identifier is Y; thus, the update information may comprise the association:

network address X:Device Identifier Y.

This update information tells the NAA server 100 to assign the network address X only to a network device having the device identifier Y.

Thereafter, the provisioning server 410 sends (block 502) an update instruction to the NAA server 100 to instruct the server to update its configuration information 108. The provisioning server 410 also sends the update information to the NAA server 100. In response, assuming the provisioning server 410 is authorized to send the update instruction, the NAA server 100 updates (block 504) the configuration information 108 with the update information. In this example, the NAA server 100 adds the association network address X:Device Identifier Y to the configuration information 108. A set of updated configuration information 108 is thus derived.

Thereafter, the provisioning server 410 causes the network device 406(1) to be started. When the network device 406(1) starts, it realizes that it does not currently have a network address. Thus, it interacts with the NAA server 100 to obtain one. More specifically, the network device 406(1) broadcasts a message requesting the network address of the NAA server 100. The NAA server 100 responds with a broadcast message containing its network address. The network device 406(1) receives this broadcast message and uses the network address contained therein to send a network address request to the NAA server 100. This network address request includes the device identifier Y of the network device 406(1). The NAA server 100 receives (block 506) this request, and processes it by accessing the updated configuration information 108. Since the updated configuration information 108 now contains an association between the device identifier Y and the network address X, the NAA server 100 will assign (block 508) network address X to network device 406(1). This address assignment is broadcasted onto the network 402; thus, both the network device 406(1) and the provisioning server 410 are made aware of the address assignment.

Thereafter, the provisioning server 410 uses (block 510) the network address X to communicate with the network device 406(1) to provision (block 510) the UNIX operating system and the web server software onto the network device 406(1). The provisioning process is thus carried out.

In one embodiment, the above process may be carried out each time a network device 406 is provisioned. Since the provisioning process includes the updating of the NAA server's configuration information 108, this means that the configuration information 108 may be updated each time a network device 406 is provisioned. If the number of network devices 406 is large or if the network devices 406 are provisioned often, then the configuration information 108 may need to be updated relatively frequently. With the NAA server 100, this is not a problem because the NAA server 100 does not incur any server downtime with each configuration information update. Thus, the NAA server 100 enables this type of system to perform much more efficiently and effectively.

Another aspect of the NAA server 100 that makes it especially advantageous is that it maintains and updates its own configuration information. This, coupled with the fact that the NAA server's configuration updating capability can be invoked by a mechanism across a network, makes it possible to implement a single centralized NAA server 100 rather than having multiple address assignment servers.

To elaborate on this point, recall from previous discussion that, in the prior art, the configuration information of a DHCP server was updated not by the server itself but by another mechanism. The other mechanism updated the server's configuration information by updating a text file in which the configuration information was stored. In order for the other mechanism to be able to access the text file, the other mechanism had to run on the same machine as the DHCP server. This meant that if a mechanism, such as the provisioning server 410, wanted to be able to update the configuration information of the DHCP server, it had to bundle the DHCP server with itself. If another mechanism wanted to be able to update the configuration information of a DHCP server, that mechanism had to bundle another DHCP server with itself. This meant that, in a single network system, multiple DHCP servers could exist and operate concurrently. In the past, this led to much confusion because it was never clear which DHCP server was assigning network addresses to which devices.

With the NAA server 100, this problem is rendered moot. Because any mechanism (so long as it is authorized) on the network can instruct the NAA server 100 to update its configuration information, there is no longer any need for a mechanism to bundle an address assignment server with itself. Because there is no need to bundle, there is also no need to have multiple address assignment servers on the same network system. Consequently, with the NAA server 100, it is possible to implement a single, centralized network address assignment server in a system.

Hardware Overview

FIG. 6 is a block diagram that illustrates a computer system 600 upon which an embodiment of the invention may be implemented. Computer system 600 includes a bus 602 for facilitating information exchange, and one or more processors 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions by processor 604. Computer system 600 may further include a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612 for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

In computer system 600, bus 602 may be any mechanism and/or medium that enables information, signals, data, etc., to be exchanged between the various components. For example, bus 602 may be a set of conductors that carries electrical signals. Bus 602 may also be a wireless medium (e.g. air) that carries wireless signals between one or more of the components. Bus 602 may further be a network connection that connects one or more of the components. Any mechanism and/or medium that enables information, signals, data, etc., to be exchanged between the various components may be used as bus 602.

Bus 602 may also be a combination of these mechanisms/media. For example, processor 604 may communicate with storage device 610 wirelessly. In such a case, the bus 602, from the standpoint of processor 604 and storage device 610, would be a wireless medium, such as air. Further, processor 604 may communicate with ROM 608 capacitively. Further, processor 604 may communicate with main memory 606 via a network connection. In this case, the bus 602 would be the network connection. Further, processor 604 may communicate with display 612 via a set of conductors. In this instance, the bus 602 would be the set of conductors. Thus, depending upon how the various components communicate with each other, bus 602 may take on different forms. Bus 602, as shown in FIG. 6, functionally represents all of the mechanisms and/or media that enable information, signals, data, etc., to be exchanged between the various components.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, a machine readable storage media (e.g. non-volatile media, volatile media), and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A method implemented by a network address assignment server, comprising:

receiving an instruction to update a set of configuration information that is used by the server in assigning network addresses, wherein the set of configuration information comprises a set of network addresses that the server can assign to network devices;

receiving update information indicating one or more updates to be made to the set of configuration information, wherein the update information comprises one or more changes to be made to the set of network addresses that the server can assign;

updating the set of configuration information in accordance with the update information to derive a set of updated configuration information, wherein updating the set of configuration information comprises deriving an updated set of network addresses that the server can assign, and wherein the updated set of network addresses is part of the set of updated configuration information;

receiving, from a network device, a request for a network address that the network device can use to receive communications on a network;

determining, based at least partially upon the set of updated configuration information, a particular network address to assign to the network device; and assigning the particular network address to the network device;

wherein the server does not need to be restarted between the updating operation and the determining operation.

2. The method of claim 1, wherein the set of configuration information is embodied in at least one data structure, and wherein updating the set of configuration information comprises:

obtaining a lock on the data structure;

updating information contained in the data structure in accordance with the update information; and releasing the lock on the data structure.

3. The method of claim 1, wherein the particular network address is a routable network address.

4. The method of claim 3, wherein the particular network address is an Internet Protocol (IP) address.

5. The method of claim 3, wherein prior to being assigned the particular network address, the network device has no routable address on the network.

6. The method of claim 1, wherein the request from the network device is for a network address for the network device itself, not for a network address of another node on the network.

7. The method of claim 1, wherein the configuration information comprises information indicating an association between a certain network address that the server can assign and a device identifier.

8. The method of claim 7, wherein the certain network address is an Internet Protocol (IP) address and wherein the device identifier comprises a media access control (MAC) address.

9. The method of claim 1, wherein the network device has an associated device identifier, wherein the update information comprises information indicating an association between the device identifier and the particular network address, and wherein updating the set of configuration information comprises:

adding the information indicating the association between the device identifier and the particular network address into the set of configuration information to derive the set of updated configuration information.

10. The method of claim 9, wherein the request from the network device comprises the device identifier, and wherein determining comprises:
   accessing the set of updated configuration information; and
   determining from the set of updated configuration information the association between the device identifier and the particular network address.

11. The method of claim 10, wherein the device identifier comprises a media access control (MAC) address and the particular network address is an Internet Protocol (IP) address.

12. A network address assignment server, comprising:
   means for receiving an instruction to update a set of configuration information that is used by the server in assigning network addresses, wherein the set of configuration information comprises a set of network addresses that the server can assign to network devices;
   means for receiving update information indicating one or more updates to be made to the set of configuration information, wherein the update information comprises one or more changes to be made to the set of network addresses that the server can assign;
   means for updating the set of configuration information in accordance with the update information to derive a set of updated configuration information, wherein updating the set of configuration information comprises deriving an updated set of network addresses that the server can assign, and wherein the updated set of network addresses is part of the set of updated configuration information;
   means for receiving, from a network device, a request for a network address that the network device can use to receive communications on a network;
   means for determining, based at least partially upon the set of updated configuration information, a particular network address to assign to the network device; and
   means for assigning the particular network address to the network device;
   wherein the server does not need to be restarted between the updating operation and the determining operation.

13. The server of claim 12, wherein the set of configuration information is embodied in at least one data structure, and wherein the means for updating the set of configuration information comprises:
   means for obtaining a lock on the data structure;
   means for updating information contained in the data structure in accordance with the update information; and
   means for releasing the lock on the data structure.

14. The server of claim 12, wherein the particular network address is a routable network address.

15. The server of claim 14, wherein the particular network address is an Internet Protocol (IP) address.

16. The server of claim 14, wherein prior to being assigned the particular network address, the network device has no routable address on the network.

17. The server of claim 12, wherein the request from the network device is for a network address for the network device itself, not for a network address of another node on the network.

18. The server of claim 12, wherein the configuration information comprises information indicating an association between a certain network address that the server can assign and a device identifier.

19. The server of claim 18, wherein the certain network address is an Internet Protocol (IP) address and wherein the device identifier comprises a media access control (MAC) address.

20. The server of claim 12, wherein the network device has an associated device identifier, wherein the update information comprises information indicating an association between the device identifier and the particular network address, and wherein the means for updating the set of configuration information comprises:
   means for adding the information indicating the association between the device identifier and the particular network address into the set of configuration information to derive the set of updated configuration information.

21. The server of claim 20, wherein the request from the network device comprises the device identifier, and wherein the means for determining comprises:
   means for accessing the set of updated configuration information; and
   means for determining from the set of updated configuration information the association between the device identifier and the particular network address.

22. The server of claim 21, wherein the device identifier comprises a media access control (MAC) address and the particular network address is an Internet Protocol (IP) address.

23. A machine readable storage medium comprising instructions for causing one or more processors to implement a network address assignment server, the server:
   receiving an instruction to update a set of configuration information that is used by the server in assigning network addresses, wherein the set of configuration information comprises a set of network addresses that the server can assign to network devices;
   receiving update information indicating one or more updates to be made to the set of configuration information, wherein the update information comprises one or more changes to be made to the set of network addresses that the server can assign;
   updating the set of configuration information in accordance with the update information to derive a set of updated configuration information, wherein updating the set of configuration information comprises deriving an updated set of network addresses that the server can assign, and wherein the updated set of network addresses is part of the set of updated configuration information;
   receiving, from a network device, a request for a network address that the network device can use to receive communications on a network;
   determining, based at least partially upon the set of updated configuration information, a particular network address to assign to the network device; and
   assigning the particular network address to the network device;
   wherein the server does not need to be restarted between the updating operation and the determining operation.

24. The machine readable storage medium of claim 23, wherein the set of configuration information is embodied in at least one data structure, and wherein updating the set of configuration information comprises:
   obtaining a lock on the data structure;
   updating information contained in the data structure in accordance with the update information; and
   releasing the lock on the data structure.

25. The machine readable storage medium of claim 23, wherein the particular network address is a routable network address.

26. The machine readable storage medium of claim 25, wherein the particular network address is an Internet Protocol (IP) address.

27. The machine readable storage medium of claim 25, wherein prior to being assigned the particular network address, the network device has no routable address on the network.

28. The machine readable storage medium of claim 23, wherein the request from the network device is for a network address for the network device itself, not for a network address of another node on the network.

29. The machine readable storage medium of claim 23, wherein the configuration information comprises information indicating an association between a certain network address that the server can assign and a device identifier.

30. The machine readable storage medium of claim 29, wherein the certain network address is an Internet Protocol (IP) address and wherein the device identifier comprises a media access control (MAC) address.

31. The machine readable storage medium of claim 23, wherein the network device has an associated device identifier, wherein the update information comprises information indicating an association between the device identifier and the particular network address, and wherein updating the set of configuration information comprises:

adding the information indicating the association between the device identifier and the particular network address into the set of configuration information to derive the set of updated configuration information.

32. The machine readable storage medium of claim 31, wherein the request from the network device comprises the device identifier, and wherein determining comprises:

accessing the set of updated configuration information; and determining from the set of updated configuration information the association between the device identifier and the particular network address.

33. The machine readable storage medium of claim 32, wherein the device identifier comprises a media access control (MAC) address and the particular network address is an Internet Protocol (IP) address.

34. A system comprising:

a network address assignment server;

a provisioning server;

a network device; and a network for communicatively coupling the network address assignment server, the provisioning server, and the network device, wherein:

the provisioning server sends: (a) an update instruction to the network address assignment server to update a set of configuration information used by the network address assignment server in assigning network addresses; and (b) update information indicating an association between a device identifier of the network device and a particular network address;

the network address assignment server receives the update instruction and the update information and updates the set of configuration information to include the update information to derive a set of updated configuration information;

the network address assignment server thereafter receiving a request from the network device for a network address, wherein the request includes the device identifier of the network device;

the network address assignment server accesses the set of updated configuration data, determines that the particular network address is associated with the device identifier of the network device, and assigns the particular network address to the network device; wherein the network address assignment server does not need to be restarted between updating the set of configuration data and determining that the particular network address is associated with the device identifier of the network device; and the provisioning server uses the particular network address to communicate with the network device to cause one or more sets of software to be provisioned on the network device.

35. The system of claim 34, wherein the particular network address is an Internet Protocol (IP) address and the device identifier of the network device comprises a media access control (MAC) address.

36. The system of claim 34, wherein the one or more sets of software comprises an operating system.

* * * * *